United States Patent
Daibo et al.

(10) Patent No.: US 12,252,086 B2
(45) Date of Patent: Mar. 18, 2025

(54) VEHICLE HORN CONFIGURATION STRUCTURE

(71) Applicant: Honda Motor Co., Ltd., Tokyo (JP)

(72) Inventors: Takahiro Daibo, Tokyo (JP); Hiroshi Suzuki, Tokyo (JP); Yusuke Takeuchi, Tokyo (JP)

(73) Assignee: Honda Montor Co., Ltd., Tokyo (JP)

( * ) Notice: Subject to any disclaimer, the term of this patent is extended or adjusted under 35 U.S.C. 154(b) by 287 days.

(21) Appl. No.: 17/960,761

(22) Filed: Oct. 5, 2022

(65) Prior Publication Data
US 2023/0109981 A1 Apr. 13, 2023

(30) Foreign Application Priority Data
Oct. 11, 2021 (CN) .......................... 202111180052.8

(51) Int. Cl.
| | | |
|---|---|---|
| *B60R 19/18* | (2006.01) | |
| *B60Q 5/00* | (2006.01) | |
| *B60R 19/02* | (2006.01) | |
| *B60R 19/48* | (2006.01) | |

(52) U.S. Cl.
CPC ............... *B60R 19/18* (2013.01); *B60Q 5/00* (2013.01); *B60R 19/023* (2013.01); *B60R 19/48* (2013.01); *B60R 2019/1806* (2013.01)

(58) Field of Classification Search
CPC ....... B60R 19/00; B60R 19/023; B60R 19/48; B60R 2019/1806; B60R 2019/486; B60R 2019/525; B60R 11/0217; B60R 11/0223; B62D 25/084; B62D 25/085; G10K 15/04; G10K 11/22; H04R 2499/13; B60Q 5/00; B60Q 5/008
See application file for complete search history.

(56) References Cited

U.S. PATENT DOCUMENTS

| | | | | |
|---|---|---|---|---|
| 2002/0100626 | A1* | 8/2002 | Kang | B62D 25/084 180/68.4 |
| 2004/0080183 | A1* | 4/2004 | Andre | B62D 29/001 296/193.04 |
| 2013/0021814 | A1* | 1/2013 | Tanaka | B62D 25/084 362/496 |
| 2016/0368364 | A1* | 12/2016 | Aoki | B60K 11/08 |
| 2019/0176694 | A1* | 6/2019 | Schmitt | B60R 19/48 |
| 2020/0307478 | A1* | 10/2020 | Eklund | B60R 19/34 |

(Continued)

FOREIGN PATENT DOCUMENTS

JP 2008010264 1/2008

*Primary Examiner* — Gregory A Blankenship
(74) *Attorney, Agent, or Firm* — JCIPRNET

(57) ABSTRACT

The vehicle horn configuration structure includes: a bumper beam arranged at a front of a vehicle and extending in a vehicle left-right direction; a bumper cover arranged at a position forward of the bumper beam in a vehicle front-rear direction; a horn component arranged at a position rearward of the bumper beam in the vehicle front-rear direction, and arranged at a position so that a sound-emitting part faces downward in a vehicle up-down direction and is located above a lower end of the bumper beam; and a duct component extending in the vehicle front-rear direction and arranged at a position located between the horn component and the bumper cover in the vehicle front-rear direction to guide a sound of the horn component to an opening provided on the bumper cover.

5 Claims, 6 Drawing Sheets

(56) References Cited

U.S. PATENT DOCUMENTS

| | | | |
|---|---|---|---|
| 2021/0237673 A1* | 8/2021 | Tokuyama | B60R 19/52 |
| 2022/0024521 A1* | 1/2022 | Tokuyama | B60R 19/52 |
| 2023/0095260 A1* | 3/2023 | Tanaka | G10K 11/22 |
| | | | 381/86 |
| 2023/0109981 A1* | 4/2023 | Daibo | B60Q 5/00 |
| | | | 293/149 |
| 2024/0166042 A1* | 5/2024 | Sumie | B60R 19/52 |
| 2024/0198901 A1* | 6/2024 | Otoyo | G10K 15/04 |

* cited by examiner

VEHICLE HORN CONFIGURATION STRUCTURE

CROSS-REFERENCE TO RELATED APPLICATION

This application claims the priority benefit of China application serial no. 202111180052.8, filed on Oct. 11, 2021. The entirety of the above-mentioned patent application is hereby incorporated by reference herein and made a part of this specification.

BACKGROUND

Technical Field

The disclosure relates to a vehicle horn configuration structure.

Description of Related Art

In the related art, a vehicle is usually equipped with a horn component to send out a warning. Such a horn component is usually provided in the exterior structure of the vehicle so as to maintain the sound pressure performance of the sound sent out by the horn component. For example, in Patent Literature 1 (Japanese Patent Laid-Open No. 2008-10264), a horn component is arranged right under the bumper beam, which can not only maintain the sound pressure performance of the horn component but also use the protection of the bumper beam to prevent the horn component from being damaged when the vehicle has a minor collision. However, such an arrangement requires an additional protective structure to be attached to the horn component to prevent foreign objects such as sand and water from intruding into the horn component from below, which results in an increase in the costs of the vehicle horn configuration structure.

SUMMARY

In an embodiment of the disclosure, a vehicle horn configuration structure is provided, which includes: a bumper beam arranged at a front of a vehicle and extending in a vehicle left-right direction; a bumper cover arranged at a position forward of the bumper beam in a vehicle front-rear direction; a horn component arranged at a position rearward of the bumper beam in the vehicle front-rear direction, and arranged at a position so that a sound-emitting part faces downward in a vehicle up-down direction and is located above a lower end of the bumper beam; and a duct component extending in the vehicle front-rear direction and arranged at a position located between the horn component and the bumper cover in the vehicle front-rear direction to guide a sound of the horn component to an opening provided on the bumper cover.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
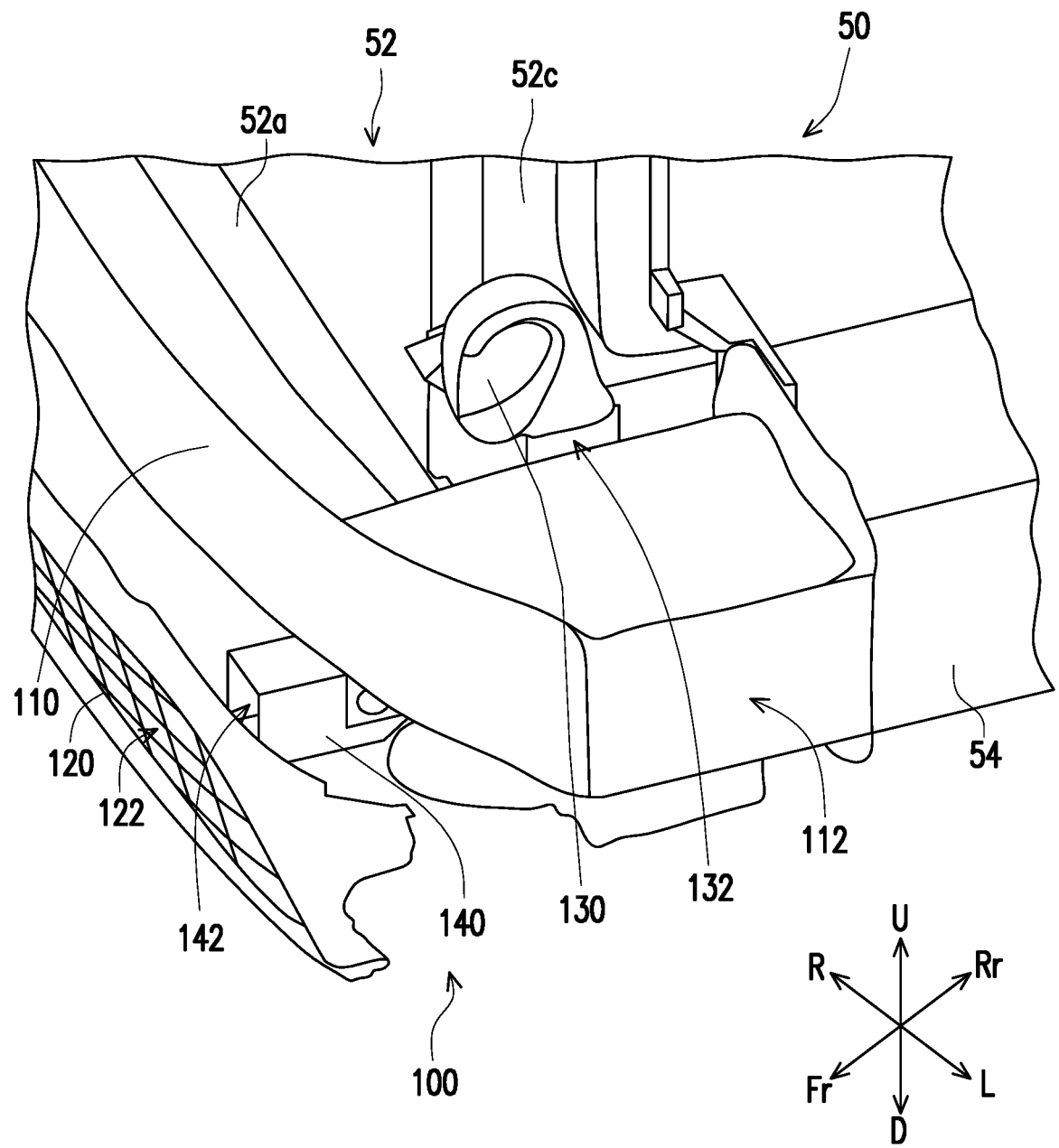
FIG. 1 is a schematic perspective view of the vehicle horn configuration structure according to an embodiment of the disclosure.

The disclosure provides a vehicle horn configuration structure, which maintains the sound pressure performance of a horn component, prevents the horn component from being damaged during a minor collision, and effectively suppresses foreign objects from intruding into the horn component.

In an embodiment of the disclosure, a vehicle horn configuration structure is provided, which includes: a bumper beam arranged at a front of a vehicle and extending in a vehicle left-right direction; a bumper cover arranged at a position forward of the bumper beam in a vehicle front-rear direction; a horn component arranged at a position rearward of the bumper beam in the vehicle front-rear direction, and arranged at a position so that a sound-emitting part faces downward in a vehicle up-down direction and is located above a lower end of the bumper beam; and a duct component extending in the vehicle front-rear direction and arranged at a position located between the horn component and the bumper cover in the vehicle front-rear direction to guide a sound of the horn component to an opening provided on the bumper cover.

In an embodiment of the disclosure, the horn component and the duct component are mounted on a side part of a bulkhead arranged at a center of the vehicle.

In an embodiment of the disclosure, a lower surface of the duct component has an inclined surface that is inclined rearward and upward.

In an embodiment of the disclosure, the inclined surface has a hole that opens rearward in the vehicle front-rear direction.

In an embodiment of the disclosure, a rear end opening of the duct component corresponds to the sound-emitting part in the vehicle front-rear direction.

In an embodiment of the disclosure, a front end of the duct component is arranged at a position rearward of a front end of the bumper beam in the vehicle front-rear direction.

Based on the above, in the vehicle horn configuration structure according to the disclosure, the horn component is arranged at a position rearward of the bumper beam in the vehicle front-rear direction, and is arranged at a position so that the sound-emitting part faces downward in the vehicle up-down direction and is located above the lower end of the bumper beam, and the duct component is arranged at a position located between the horn component and the bumper cover in the vehicle front-rear direction so as to guide the sound of the horn component to the opening provided on the bumper cover. Therefore, when the vehicle has a minor collision, the protection of the bumper beam can prevent the horn component at the rear from being damaged, and foreign objects from below are less likely to intrude into the horn component from the sound-emitting part arranged above the lower end of the bumper beam (the duct component also has a function of blocking out foreign objects below the horn component), and the sound of the horn component can be guided to the opening provided on the bumper cover through the duct component to be transmitted to the outside, thereby maintaining the sound pressure performance. Accordingly, the vehicle horn configuration structure according to the disclosure can maintain the sound pressure performance of the horn component, prevent the horn component from being damaged during a minor collision, and effectively suppress foreign objects from intruding into the horn component.

In order to make the above-mentioned and other features and advantages of the disclosure more comprehensible, exemplary embodiments will be described in detail hereinafter with reference to the accompanying drawings.

Figure 2:
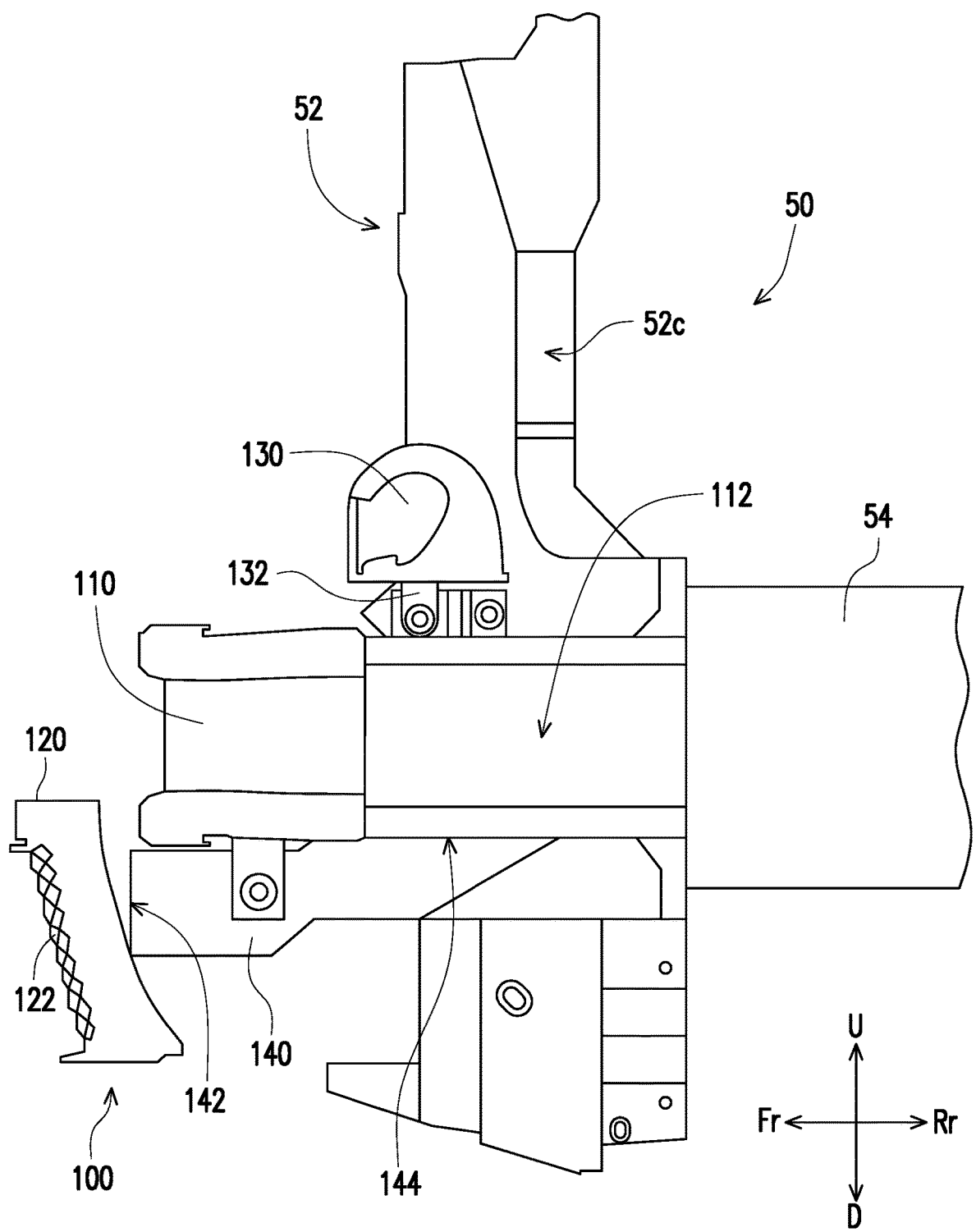
FIG. 2 is a schematic side view of the vehicle horn configuration structure shown in FIG. 1.
Figure 3:
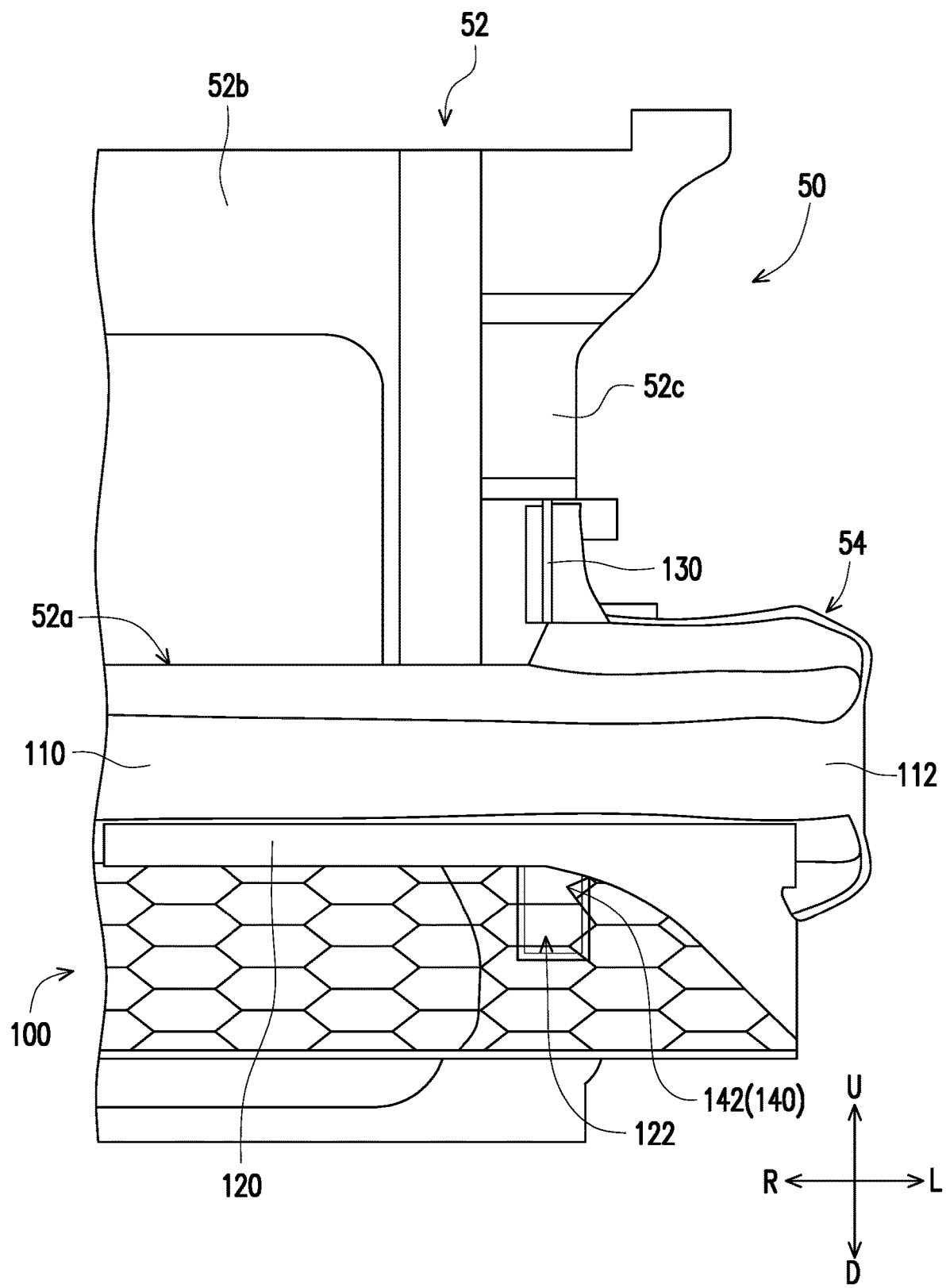
FIG. 3 is a schematic front view of the vehicle horn configuration structure shown in FIG. 1.
Figure 4:
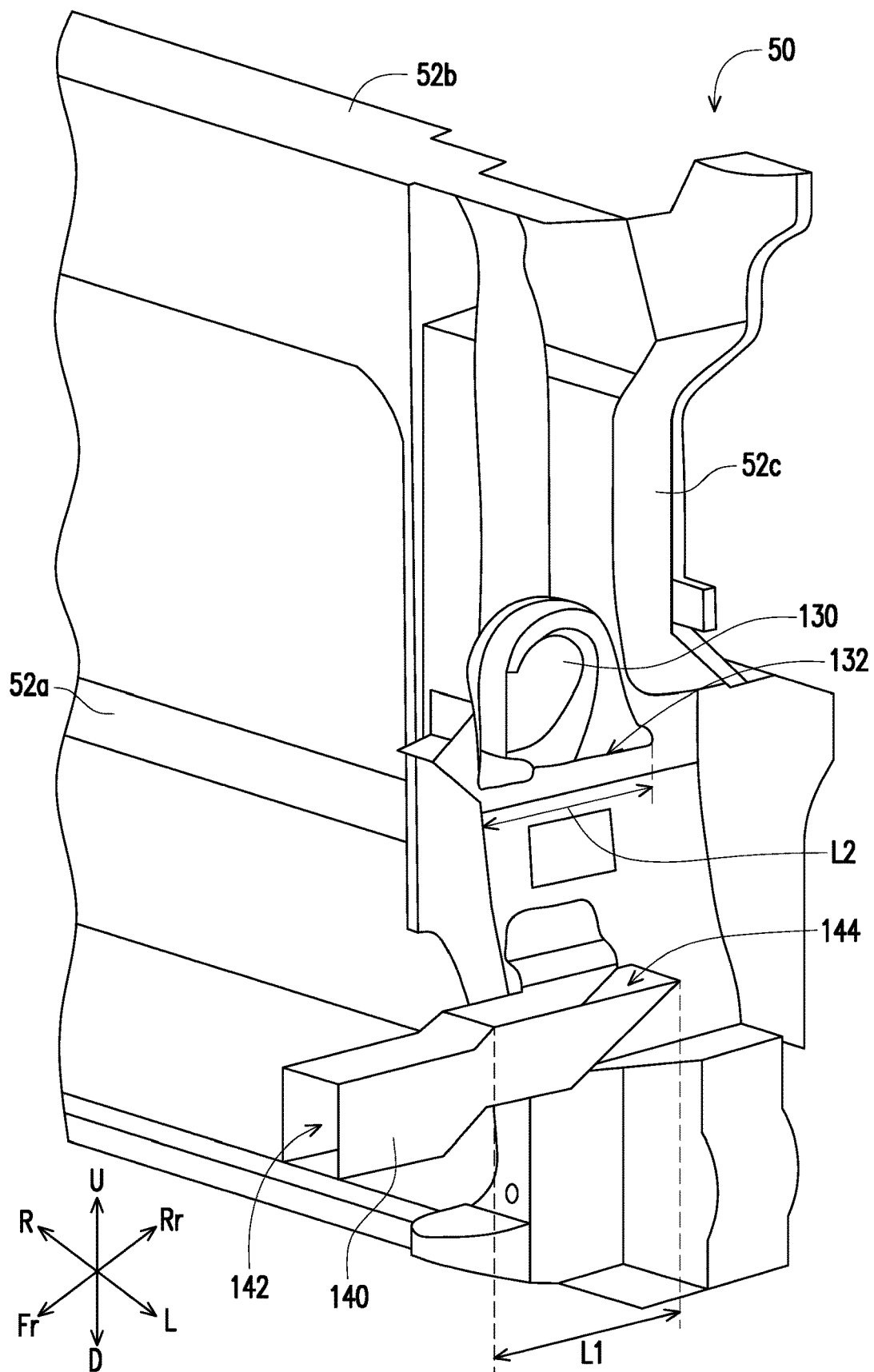
FIG. 4 is a schematic view showing the relative positions of the horn component and the duct component used in the vehicle horn configuration structure shown in FIG. 1 on the vehicle body.
Figure 5:
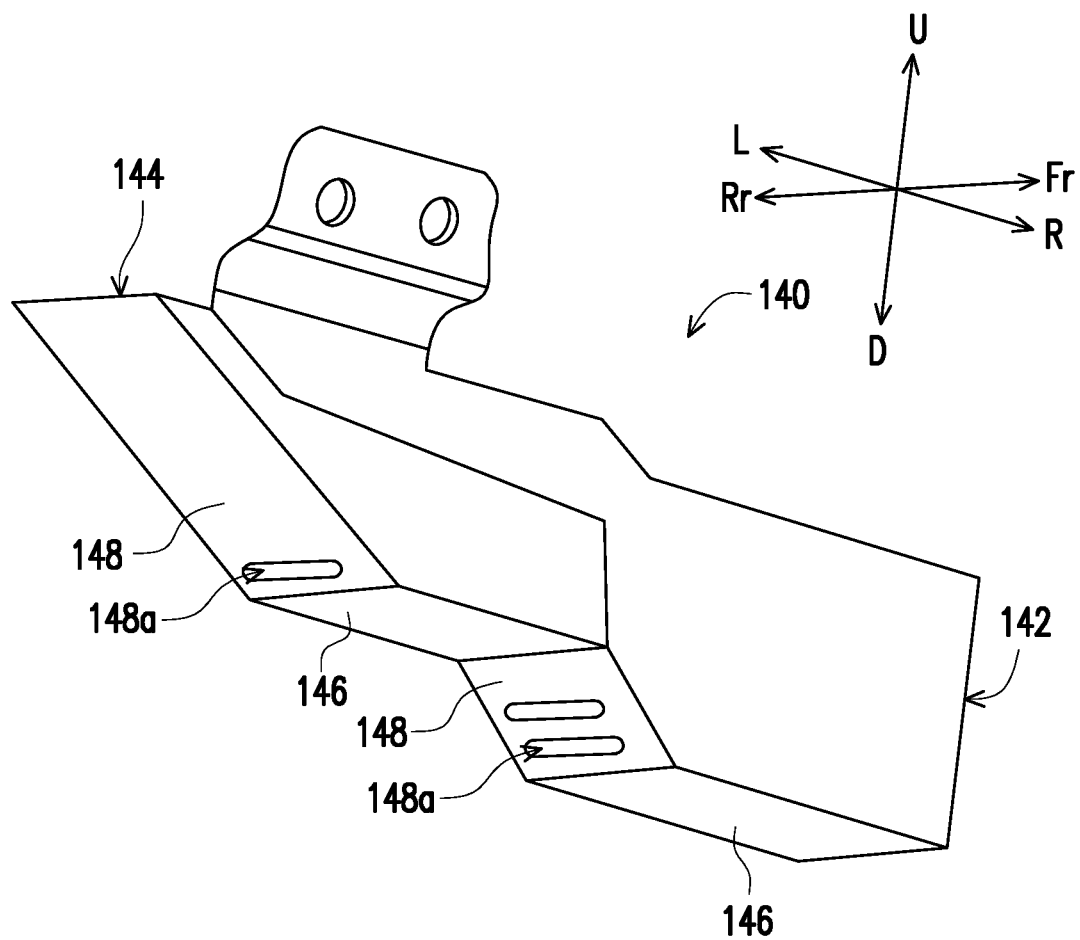
FIG. 5 is a schematic perspective view of the duct component used in the vehicle horn configuration structure shown in FIG. 1 at a different viewing angle.
Figure 6:
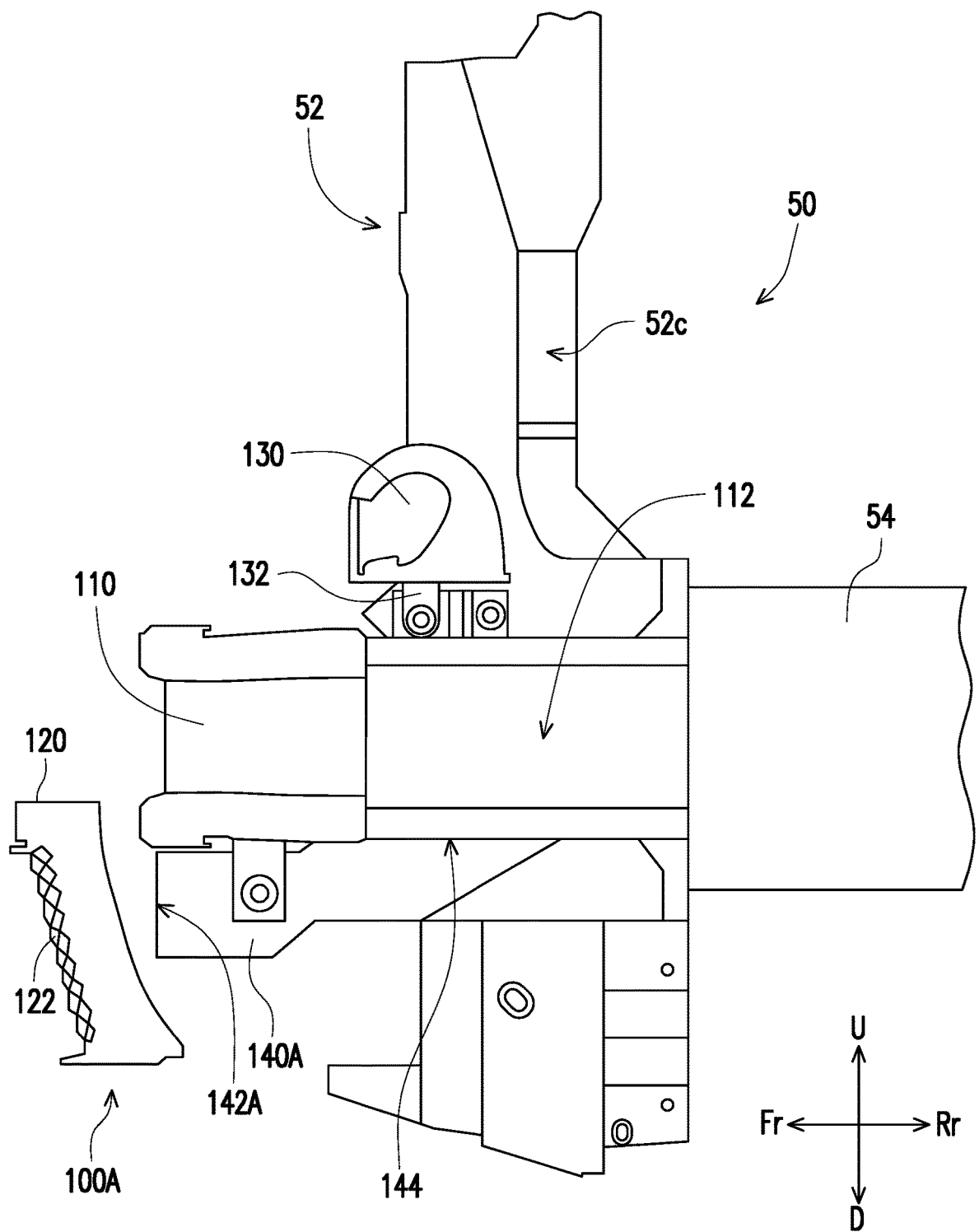
FIG. 6 is a schematic side view of the vehicle horn configuration structure according to another embodiment of the disclosure.

Reference will now be made in detail to the exemplary embodiments of the disclosure, examples of which are illustrated in the accompanying drawings. FIG. 1 is a schematic perspective view of the vehicle horn configuration structure according to an embodiment of the disclosure. FIG. 2 is a schematic side view of the vehicle horn configuration structure shown in FIG. 1. FIG. 3 is a schematic front view of the vehicle horn configuration structure shown in FIG. 1. FIG. 4 is a schematic view showing the relative positions of the horn component and the duct component used in the vehicle horn configuration structure shown in FIG. 1 on the vehicle body. FIG. 5 is a schematic perspective view of the duct component used in the vehicle horn configuration structure shown in FIG. 1 at a different viewing angle. FIG. 6 is a schematic side view of the vehicle horn configuration structure according to another embodiment of the disclosure. The specific structure and use of a vehicle horn configuration structure 100 according to an exemplary embodiment of the disclosure will be described hereinafter with reference to FIG. 1 to FIG. 6. Nevertheless, the disclosure is not limited thereto.

Referring to FIG. 1 to FIG. 3, in the present embodiment, the vehicle horn configuration structure 100 includes a bumper beam 110, a bumper cover 120, a horn component 130, and a duct component 140. The vehicle horn configuration structure 100 is arranged, for example, on a vehicle body structure 50 at the front of a vehicle (not shown). The vehicle body structure 50 arranged at the front of the vehicle generally includes a bulkhead 52 arranged at the center of the vehicle, and a pair of side frames 54 arranged separately in the vehicle left-right direction (that is, the vehicle left direction L and the vehicle right direction R). The bumper beam 110, the bumper cover 120, the horn component 130, and the duct component 140 of the vehicle horn configuration structure 100 may be arranged on the bulkhead 52, and the pair of side frames 54 are then arranged on the bumper beam 110. However, the disclosure is not intended to limit the structural composition of the vehicle horn configuration structure 100 and the use thereof on the vehicle, which can be adjusted according to requirements.

Specifically, in the present embodiment, the bulkhead 52 arranged in the vehicle body structure 50 at the front of the vehicle has, for example, a bulkhead lower part 52a, a bulkhead upper part 52b, and a pair of bulkhead side parts 52c. The bulkhead lower part 52a (shown in FIG. 1) and the bulkhead upper part 52b (shown in FIG. 3) are arranged separately in the vehicle up-down direction (that is, the vehicle up direction U and the vehicle down direction D), and respectively extend along the vehicle left-right direction. The pair of bulkhead side parts 52c (the bulkhead side part 52c located in the vehicle left direction L is shown in FIG. 1 to FIG. 3) are arranged separately in the vehicle left-right direction, and respectively extend along the vehicle up-down direction. The bulkhead lower part 52a, the bulkhead upper part 52b, and the pair of bulkhead side parts 52c are connected to one another, whereby the bulkhead 52 is constituted. However, the disclosure is not intended to limit the structural composition of the vehicle body structure 50 arranged at the front of the vehicle, which can be adjusted according to requirements.

In the present embodiment, the bumper beam 110 is arranged at the front of the vehicle (not shown), and extends in the vehicle left-right direction (that is, the vehicle left direction L and the vehicle right direction R), for example, across the left and right sides of the front of the vehicle. Preferably, the bumper beam 110 is arranged forward of the bulkhead lower part 52a (shown in FIG. 1) of the bulkhead 52. Both the bumper beam 110 and the bulkhead lower part 52a are strip-like structures extending in the vehicle left-right direction, so that the rear of the bumper beam 110 can be supported by the bulkhead 52. Furthermore, the left and right ends of the bumper beam 110 are further provided with connecting parts 112 (the connecting part 112 located in the vehicle left direction L is shown in FIG. 1 to FIG. 3). The connecting parts 112 of the bumper beam 110 extend rearward in the vehicle front-rear direction (that is, the vehicle front direction Fr and the vehicle rear direction Rr), and thus extend from opposite two ends of the bulkhead lower part 52a to the bulkhead side parts 52c. Further, the pair of side frames 54 are arranged at the connecting parts 112 at the left and right ends of the bumper beam 110 (the side frame 54 located in the vehicle left direction L is shown in FIG. 1 and FIG. 2), and extend rearward in the vehicle front-rear direction. However, the disclosure is not intended to limit the structural composition of the bumper beam 110, which can be adjusted according to requirements.

Furthermore, in the present embodiment, the bumper cover 120 is arranged at a position forward of the bumper beam 110 in the vehicle front-rear direction (that is, the vehicle front direction Fr and the vehicle rear direction Rr), and can be regarded as the foremost member in the vehicle horn configuration structure 100. Similar to the bumper beam 110 and the bulkhead lower part 52a, the bumper cover 120 is also a strip-like structure extending in the vehicle left-right direction (that is, the vehicle left direction L and the vehicle right direction R), so that the rear of the bumper cover 120 can be supported by the bumper beam 110. Here, although the bumper cover 120 is mounted on the vehicle body structure 50 via an unillustrated member and is not connected to the bumper beam 110 in FIG. 1 to FIG. 3, the bumper cover 120 can be installed on the bumper beam 110 as required. The disclosure is not intended to limit the structural composition of the bumper cover 120, which can be adjusted according to requirements.

In addition, in the present embodiment, the horn component 130 is arranged at a position rearward of the bumper beam 110 in the vehicle front-rear direction (that is, the vehicle front direction Fr and the vehicle rear direction Rr), and is arranged at a position so that a sound-emitting part 132 faces downward in the vehicle up-down direction (that is, the vehicle up direction U and the vehicle down direction D) and is located above the lower end of the bumper beam 110. The sound-emitting part 132 refers to a part where the sound of the horn component 130 is emitted, and may also be called a bell mouth. Other parts of the horn component 130 are protected by the casing thereof. The sound-emitting part 132 of the horn component 130 is open for the sound to flow out, and the horn component 130 is installed via the casing thereof. Preferably, the horn component 130 is arranged at a position so that the sound-emitting part 132 facing downward is located above the upper end of the bumper beam 110 in the vehicle up-down direction. That is to say, the whole horn component 130 is higher than the whole bumper beam 110, so the horn component 130 and the bumper beam 110 are completely staggered in the vehicle up-down direction (as shown in FIG. 1 to FIG. 3). However, the disclosure is not intended to limit the structural composition and position of the horn component 130, which can be adjusted according to requirements.

Furthermore, in the present embodiment, the duct component 140 extends in the vehicle front-rear direction (that is, the vehicle front direction Fr and the vehicle rear direction Rr), and is arranged at a position located between the horn component 130 and the bumper cover 120 in the vehicle front-rear direction so as to guide the sound of the horn component 130 to an opening 122 provided on the bumper cover 120. Here, the duct component 140 is, for example, a tubular structure, and has a front end opening 142, a rear end opening 144, and a channel therebetween. The duct component 140 is provided at a position between the horn component 130 and the bumper cover 120, and extends in the vehicle front-rear direction. Preferably, the duct component 140 is arranged at a position below the bumper beam 110 in the vehicle up-down direction (that is, the vehicle up direction U and the vehicle down direction D), and the front end of the duct component 140 (that is, the end where the front end opening 142 is located) is arranged at a position forward of the front end of the bumper beam 110 in the vehicle front-rear direction. Thereby, the duct component 140 is arranged to pass the bumper beam 110 located behind the bumper cover 120 and located in front of the horn component 130 (as shown in FIG. 1, FIG. 2, and FIG. 4). However, the disclosure is not intended to limit the structural composition of the duct component 140, which can be adjusted according to requirements.

More specifically, referring to FIG. 4, in the present embodiment, the horn component 130 and the duct component 140 are preferably installed on the side part of the bulkhead 52 arranged at the center of the vehicle, that is, on the bulkhead side part 52c. Since the bulkhead 52 is provided with a pair of left and right bulkhead side parts 52c (the bulkhead side part 52c located in the vehicle left direction L is shown in FIG. 1 to FIG. 4), the horn components 130 and the duct components 140 may be provided in pair on the left and right and may be respectively arranged on the corresponding bulkhead side parts 52c. By mounting the horn component 130 and the duct component 140 on common parts (such as the bulkhead side parts 52c of the bulkhead 52), the positional relationship between the horn component 130 and the duct component 140 can be set more easily, which reduces the influence of errors in assembly after they are mounted on different parts. However, the disclosure is not intended to limit the installation positions and the number of the horn components 130 and the duct components 140, which can be adjusted according to requirements.

The following description is based on the horn component 130 and the duct component 140 which are mounted on the bulkhead side part 52c located in the vehicle left direction L as shown in FIG. 4. In the present embodiment, the horn component 130 is mounted on the bulkhead side part 52c with the sound-emitting part 132 facing downward, and the duct component 140 is mounted on the bulkhead side part 52c at the end close to the rear end opening 144. Here, the duct component 140 is preferably arranged below the bumper beam 110 to pass the bumper beam 110, and the horn component 130 is preferably arranged above the bumper beam 110 (at least the sound-emitting part 132 facing downward is located above the lower end of the bumper beam 110). Therefore, the horn component 130 is arranged at a position above the duct component 140 in the vehicle up-down direction (that is, the vehicle up direction U and the vehicle down direction D). Thereby, after the bumper beam 110 is mounted at the front of the vehicle body, for example, on the bulkhead lower part 52a, the connecting part 112 of the bumper beam 110 is located between the horn component 130 and the duct component 140 (as shown in FIG. 1 to FIG. 3). As shown in FIG. 1, the bumper beam 110 and the horn component 130 are separated by a distance in the vehicle front-rear direction. Therefore, regardless of whether the horn component 130 is arranged with the downward facing sound-emitting part 132 located above the lower end of the bumper beam 110 or above the upper end of the bumper beam 110 to be completely staggered, the position of the horn component 130 in the vehicle up-down direction is not interfered by the bumper beam 110, which can be adjusted according to requirements.

In addition, in the present embodiment, the rear end opening 144 of the duct component 140 corresponds to the horn component 130 in the vehicle front-rear direction (that is, the vehicle front direction Fr and the vehicle rear direction Rr). For example, the rear end opening 144 of the duct component 140 faces upward in the vehicle up-down direction (that is, the vehicle up direction U and the vehicle down direction D), and therefore the downward facing sound-emitting part 132 of the horn component 130 faces the rear end opening 144. Preferably, the length L1 of the rear end opening 144 of the duct component 140 is greater than the length L2 (marked in FIG. 4) of the sound-emitting part 132 of the horn component 130, but the disclosure is not limited thereto. Accordingly, the front end opening 142 of the duct component 140 is forward of and below the bulkhead 52 and the bumper beam 110 in the vehicle front-rear direction, so that the front end opening 142 of the duct component 140 faces the bumper cover 120. Furthermore, at least a part of the bumper cover 120 (as shown on the lower side) is preferably arranged below the bumper beam 110 in the vehicle up-down direction (as shown in FIG. 1 to FIG. 3), so that the front end opening 142 of the duct component 140 can correspond to the opening 122 of the bumper cover 120 as shown in FIG. 3. Preferably, the area of the opening 122 of the bumper cover 120 is larger than the area of the front end opening 142 of the duct component 140 (see the ratio shown in FIG. 3). For example, at least a part of the bumper cover 120 is formed into a mesh shape to have a plurality of closely arranged openings 122, but the disclosure is not limited thereto.

Thus, in the present embodiment, the downward facing sound-emitting part 132 of the horn component 130 corresponds to the upward facing rear end opening 144 of the duct component 140 in the vehicle front-rear direction (that is, the vehicle front direction Fr and the vehicle rear direction Rr), and the forward facing front end opening 142 of the duct component 140 corresponds to the opening 122 of the bumper cover 120 in the vehicle up-down direction (that is, the vehicle up direction U and the vehicle down direction D), so that the sound of the horn component 130 can be guided from the sound-emitting part 132 to the opening 122 provided on the bumper cover 120 through the rear end opening 144 and the front end opening 142 of the duct component 140, and then be transmitted to the outer side (that is, the front side) of the vehicle, thereby maintaining the sound pressure performance. In addition, when the vehicle has a minor collision, the protection of the bumper beam 110 can prevent the horn component 130 at the rear from being damaged, and foreign objects (sand, water, etc.) from below are less likely to intrude into the horn component 130 from the sound-emitting part 132 that is arranged above the lower end of the bumper beam 110 (the duct component 140 also has a function of blocking out foreign objects below the horn component 130). Accordingly, the vehicle horn configuration structure 100 can maintain the sound pressure performance of the horn component 130, prevent the horn component 130 from being damaged during a minor collision, and effectively suppress foreign objects from intruding into the horn component 130.

Referring to FIG. 4 and FIG. 5, the duct component 140 in FIG. 4 is viewed from the front to the rear and from the top to the bottom, and the duct component 140 in FIG. 5 is viewed from the rear to the front and from the bottom to the top. Therefore, the lower half of the duct component 140 that cannot be seen from the viewing angle of FIG. 4 is shown in FIG. 5. In the present embodiment, a lower surface 146 of the duct component 140 is formed with an inclined surface 148 that is inclined rearward and upward, and the inclined surface 148 is provided with a hole 148a that opens rearward in the vehicle front-rear direction (as shown in FIG. 5). That is to say, the front end of the duct component 140 (that is, the end where the front end opening 142 is located) is formed into a straight tubular shape, and then the lower surface 146 is formed with the inclined surface 148 inclined rearward and upward. Therefore, the tubular body of the duct component 140 is narrowed upward. Accordingly, even if foreign objects (sand, water, etc.) from below enter the duct component 140 from the front end opening 142 of the duct component 140, the foreign objects are blocked by the inclined surface 148 and do not enter the rear end of the duct component 140 (that is, the end where the rear end opening 144 is located). Furthermore, the foreign objects (sand, water, etc.) can also be discharged from the hole 148a on the inclined surface 148 without being accumulated in the duct component 140. Although FIG. 5 shows a two-stage inclined surface 148 with a plurality of holes 148a, the numbers and positions of the inclined surfaces 148 and the holes 148a can be adjusted according to requirements, and the disclosure is not limited thereto.

Further, referring to FIG. 6, in the embodiment of FIG. 6, the specific structure of the vehicle horn configuration structure 100A is similar to the structure of the vehicle horn configuration structure 100 shown in FIG. 1 to FIG. 5. In particular, the difference between the vehicle horn configuration structure 100A of FIG. 6 and the vehicle horn configuration structure 100 of FIG. 2 mainly lies in that: in the embodiment of FIG. 6, the front end of the duct component 140A (that is, the end where the front end opening 142A is located) is arranged at a position rearward of the front end of the bumper beam 110 in the vehicle front-rear direction (that is, the vehicle front direction Fr and the vehicle rear direction Rr). Accordingly, when the vehicle has a minor collision, the bumper cover 120 collides with the bumper beam 110 first, so that the protection of the bumper beam 110 can prevent the duct component 140A at the rear from being damaged. At this time, the forward facing front end opening 142A of the duct component 140A still corresponds to the opening 122 of the bumper cover 120 in the vehicle up-down direction (that is, the vehicle up direction U and the vehicle down direction D). Therefore, the sound of the horn component 130 can still be guided to the opening 122 provided on the bumper cover 120 through the duct component 140A to be transmitted to the outer side, thereby maintaining the sound pressure performance. However, the disclosure is not limited thereto, which can be adjusted according to requirements.

To sum up, in the vehicle horn configuration structure according to the disclosure, the horn component is arranged at a position rearward of the bumper beam in the vehicle front-rear direction, and is arranged at a position so that the sound-emitting part faces downward in the vehicle up-down direction and is located above the lower end of the bumper beam, and the duct component is arranged at a position located between the horn component and the bumper cover in the vehicle front-rear direction so as to guide the sound of the horn component to the opening provided on the bumper cover. Preferably, the rear end opening of the duct component corresponds to the sound-emitting part in the vehicle front-rear direction, the lower surface of the duct component is formed with an inclined surface inclined rearward and upward, and the inclined surface is provided with a hole that opens rearward in the vehicle front-rear direction. Therefore, when the vehicle has a minor collision, the protection of the bumper beam can prevent the horn component at the rear from being damaged, and foreign objects from below are less likely to intrude into the horn component from the sound-emitting part arranged above the lower end of the bumper beam (the duct component also has a function of blocking out foreign objects below the horn component), and the sound of the horn component can be guided to the opening provided on the bumper cover through the duct component to be transmitted to the outside, thereby maintaining the sound pressure performance. Accordingly, the vehicle horn configuration structure according to the disclosure can maintain the sound pressure performance of the horn component, prevent the horn component from being damaged during a minor collision, and effectively suppress foreign objects from intruding into the horn component.

Finally, it should be noted that the above embodiments are merely examples of the technical solutions of the disclosure and are not intended to limit the disclosure. Although the disclosure has been described in detail with reference to the foregoing embodiments, people having ordinary knowledge in the art should understand that the technical solutions described in the foregoing embodiments may be modified, or some or all of the technical features thereof may be equivalently replaced, but such modifications or replacements do not make the essence of the corresponding technical solutions deviate from the scope of the technical solutions of the embodiments of the disclosure.

What is claimed is:

1. A vehicle horn configuration structure, comprising:
    a bumper beam arranged at a front of a vehicle and extending in a vehicle left-right direction;
    a bumper cover arranged at a position forward of the bumper beam in a vehicle front-rear direction;
    a horn component arranged at a position rearward of the bumper beam in the vehicle front-rear direction, and arranged at a position so that a sound-emitting part faces downward in a vehicle up-down direction and is located above a lower end of the bumper beam; and
    a duct component extending in the vehicle front-rear direction and arranged at a position located between the horn component and the bumper cover in the vehicle front-rear direction to guide a sound of the horn component to an opening provided on the bumper cover, wherein a lower surface of the duct component has an inclined surface that is inclined rearward and upward, and the inclined surface has a hole that opens rearward in the vehicle front-rear direction.

2. The vehicle horn configuration structure according to claim 1, wherein the horn component and the duct component are mounted on a side part of a bulkhead arranged at a center of the vehicle.

3. The vehicle horn configuration structure according to claim 1, wherein a rear end opening of the duct component corresponds to the sound-emitting part in the vehicle front-rear direction.

4. The vehicle horn configuration structure according to claim 2, wherein a rear end opening of the duct component corresponds to the sound-emitting part in the vehicle front-rear direction.

5. The vehicle horn configuration structure according to claim 1, wherein a front end of the duct component is arranged at a position rearward of a front end of the bumper beam in the vehicle front-rear direction.

* * * * *